US009581178B2

(12) United States Patent
Liao

(10) Patent No.: US 9,581,178 B2
(45) Date of Patent: Feb. 28, 2017

(54) SYSTEMS AND METHODS FOR HEAT BALANCE AND TRANSPORT FOR AIRCRAFT HYDRAULIC SYSTEMS

(71) Applicant: The Boeing Company, Seal Beach, CA (US)

(72) Inventor: Jianmin Liao, Bothell, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 13/937,490

(22) Filed: Jul. 9, 2013

(65) Prior Publication Data
US 2015/0096288 A1 Apr. 9, 2015

(51) Int. Cl.
| F15B 21/04 | (2006.01) |
| B64C 13/42 | (2006.01) |
| B64C 13/36 | (2006.01) |
| B64C 25/22 | (2006.01) |
| F15B 1/26 | (2006.01) |

(52) U.S. Cl.
CPC ............ F15B 21/042 (2013.01); B64C 13/36 (2013.01); B64C 13/42 (2013.01); B64C 25/22 (2013.01); F15B 1/26 (2013.01); F15B 2211/20576 (2013.01); F15B 2211/611 (2013.01); F15B 2211/62 (2013.01)

(58) Field of Classification Search
CPC .. F15B 21/042; B64D 2013/0614; F02C 7/14; Y02T 50/675
USPC .... 165/139, 161, 96; 60/422, 420, 427, 403, 60/404, 405; 3/139, 161; 244/78.1
See application file for complete search history.

(56) References Cited

U.S. PATENT DOCUMENTS

| 3,699,847 A | 10/1972 | Little | |
| 5,100,082 A * | 3/1992 | Archung | B64D 41/00 244/76 R |
| 5,615,547 A | 4/1997 | Beutin et al. | |
| 6,354,089 B1 * | 3/2002 | Lech | E02F 9/00 62/50.2 |
| 6,415,595 B1 | 7/2002 | Wilmot, Jr. et al. | |
| 6,966,180 B2 * | 11/2005 | Deneir | F04B 49/08 60/327 |

(Continued)

FOREIGN PATENT DOCUMENTS

| EP | 0721061 A1 | 7/1993 |
| EP | 2570344 A2 | 3/2013 |

(Continued)

OTHER PUBLICATIONS

Bell et al. (Bell, K. J. and Mueller, A. C. "Wolverine Engineering Data Book II" 2001, Wolverine Tube Inc. [electronic handbook]. Retrieved on Sep. 16, 2015 from URL: <.*

(Continued)

*Primary Examiner* — F. Daniel Lopez
*Assistant Examiner* — Richard Drake
(74) *Attorney, Agent, or Firm* — Armstrong Teasdale LLP

(57) ABSTRACT

A thermal management system is provided. The thermal management system includes a first hydraulic system for circulating a first hydraulic fluid at a first temperature, a second hydraulic system for circulating a second hydraulic fluid at a second temperature that is higher than the first temperature, and a heat exchanger coupling the first hydraulic system to the second hydraulic system, wherein the heat exchanger is configured to exchange heat between the first hydraulic fluid and the second hydraulic fluid.

21 Claims, 8 Drawing Sheets

(56) References Cited

U.S. PATENT DOCUMENTS

| | | | |
|---|---|---|---|
| 7,520,465 B2 | 4/2009 | Mahjoub | |
| 8,484,962 B2 * | 7/2013 | Behr | B64C 13/40 |
| | | | 244/99.5 |
| 2008/0283223 A1 | 11/2008 | Chang et al. | |
| 2009/0025811 A1 | 1/2009 | Zagni et al. | |
| 2009/0229794 A1 | 9/2009 | Schon | |
| 2009/0321062 A1 * | 12/2009 | Ebigt | B64D 13/06 |
| | | | 165/276 |
| 2010/0170238 A1 | 7/2010 | Behr et al. | |
| 2010/0221627 A1 | 9/2010 | Nakakubo | |
| 2010/0300653 A1 * | 12/2010 | Bonner | F28D 7/16 |
| | | | 165/96 |
| 2011/0036544 A1 * | 2/2011 | Shirai | E03D 9/08 |
| | | | 165/95 |
| 2012/0043055 A1 * | 2/2012 | Byon | F28D 7/106 |
| | | | 165/96 |
| 2012/0175080 A1 | 7/2012 | Muehthaler et al. | |
| 2013/0037234 A1 | 2/2013 | Mackin | |
| 2013/0068885 A1 | 3/2013 | Onomichi et al. | |

FOREIGN PATENT DOCUMENTS

| | | |
|---|---|---|
| FR | 2862724 A1 | 5/2005 |
| WO | 2004025094 A1 | 3/2004 |

OTHER PUBLICATIONS

European Search Report, Application No. 14172816.2, dated Jan. 12, 2015, pp. 4.

Thermal Design and Heat Sink Manufacturing & Testing—Total Thermal and Heat Sink Solutions from Enertron, Inc., Heat Pipe Selection (2006) retrieved from website http://www.enertron-inc.com/enertron-products/heat-pipe-selection.php (4 pgs).

* cited by examiner

SYSTEMS AND METHODS FOR HEAT BALANCE AND TRANSPORT FOR AIRCRAFT HYDRAULIC SYSTEMS

BACKGROUND

The present disclosure relates generally to thermal management, and more particularly to systems and methods for use in balancing and transporting heat among hydraulic systems within an aircraft.

In at least some known aircraft, heat from one or more hydraulic systems is dissipated into fuel through a heat exchanger located inside a fuel tank. Other known aircraft have no hydraulic system heat exchangers and address hydraulic fluid heating through restrictions and limitations on operation of such aircraft when an outside ambient temperature is above a predetermined threshold. Additionally, some known aircraft include a thermostat control to selectively cause hydraulic fluid to bypass a heat exchanger, in order to retain heat and to reduce pressure loss in hydraulic lines when the outside ambient temperature is below a predetermined threshold. Additionally, some known aircraft use hydraulic system circulating flow to control the temperature of hydraulic fluid. More specifically, in such aircraft, hydraulic orifice valves are installed in extremities of hydraulic systems to adjust system internal leakage so as to control heat generated through the orifices and total heat loss from hydraulic tubing to the ambient. Additionally, some known aircraft use guided ram air flow to cool the temperature of hydraulic fluid. Accordingly, such systems require substantial modification to structural surfaces of an aircraft. In summary, there exists a need for a cost-effective and efficient system for heating and cooling of hydraulic fluid within an aircraft.

BRIEF DESCRIPTION

In one aspect, a thermal management system is provided. The thermal management system includes a first hydraulic system for circulating a first hydraulic fluid at a first temperature, a second hydraulic system for circulating a second hydraulic fluid at a second temperature that is higher than the first temperature, and a heat exchanger coupling the first hydraulic system to the second hydraulic system, wherein the heat exchanger is configured to exchange heat between the first hydraulic fluid and the second hydraulic fluid.

In another aspect, an aircraft is provided. The aircraft includes a first hydraulic system for circulating a first hydraulic fluid at a first temperature, a second hydraulic system for circulating a second hydraulic fluid at a second temperature that is higher than the first temperature, and a heat exchanger coupling the first hydraulic system to the second hydraulic system. The heat exchanger is configured to exchange heat between the first hydraulic fluid and the second hydraulic fluid.

In another aspect, a method for managing temperatures in a machine is provided. The method includes circulating a first hydraulic fluid at a first temperature through a first hydraulic system coupled to the machine. The method additionally includes circulating a second hydraulic fluid at a second temperature that is different from the first temperature through a second hydraulic system coupled to the machine. The method also includes exchanging heat between the first hydraulic fluid and the second hydraulic fluid with a heat exchanger that couples the first hydraulic system to the second hydraulic system.

DETAILED DESCRIPTION

Figure 1:
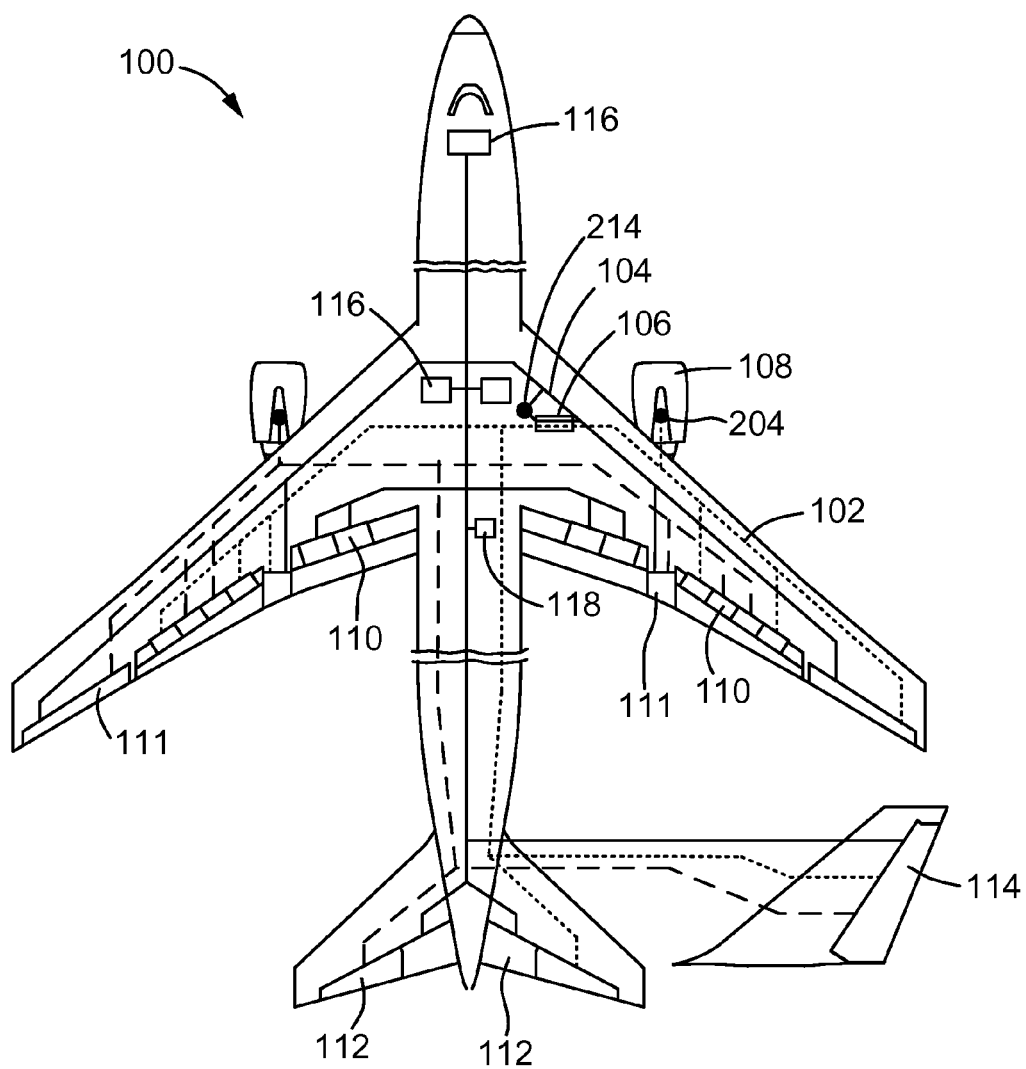
FIG. 1 is a diagram of an example aircraft that includes hydraulic systems and aircraft operating components that are powered by the hydraulic systems.

FIG. 1 is a diagram of an aircraft 100 that includes a first hydraulic system 102 and a second hydraulic system 104. First hydraulic system 102 and second hydraulic system 104 are coupled together by a heat exchanger 106. First hydraulic system 102 is pressurized by a pump device 204 that is driven by an engine 108 of aircraft 100 and provides power for certain operating components of aircraft 100. For example, first hydraulic system 102 powers at least one spoiler 110, at least one aileron 111, at least one elevator 112, and/or at least one rudder 114 in aircraft 100. Additionally, second hydraulic system 104 powers components of aircraft 100 similar to the first hydraulic system and, in addition, other components that are not powered by first hydraulic system 102. For example, second hydraulic system 104 powers landing gear 116 and/or brakes 118 of aircraft 100. In some implementations, first hydraulic system 102 is routed in a way that more heat is dissipated from hydraulic tubing to surrounding ambient and causes hydraulic fluid within first hydraulic system 102 to be colder than hydraulic fluid in second hydraulic system 104. In some implementations, second hydraulic system 104 uses a pump 214 that may be different from pump 204 used in first hydraulic system 102 and may generate more heat than pump 204, resulting in a warmer second hydraulic system 104. In some implementations, aircraft 100 may include additional hydraulic systems that power other components of aircraft 100. Additionally, in some implementations, aircraft 100 is any other machine that includes at least two hydraulic systems coupled by heat exchanger 106.

Figure 2:
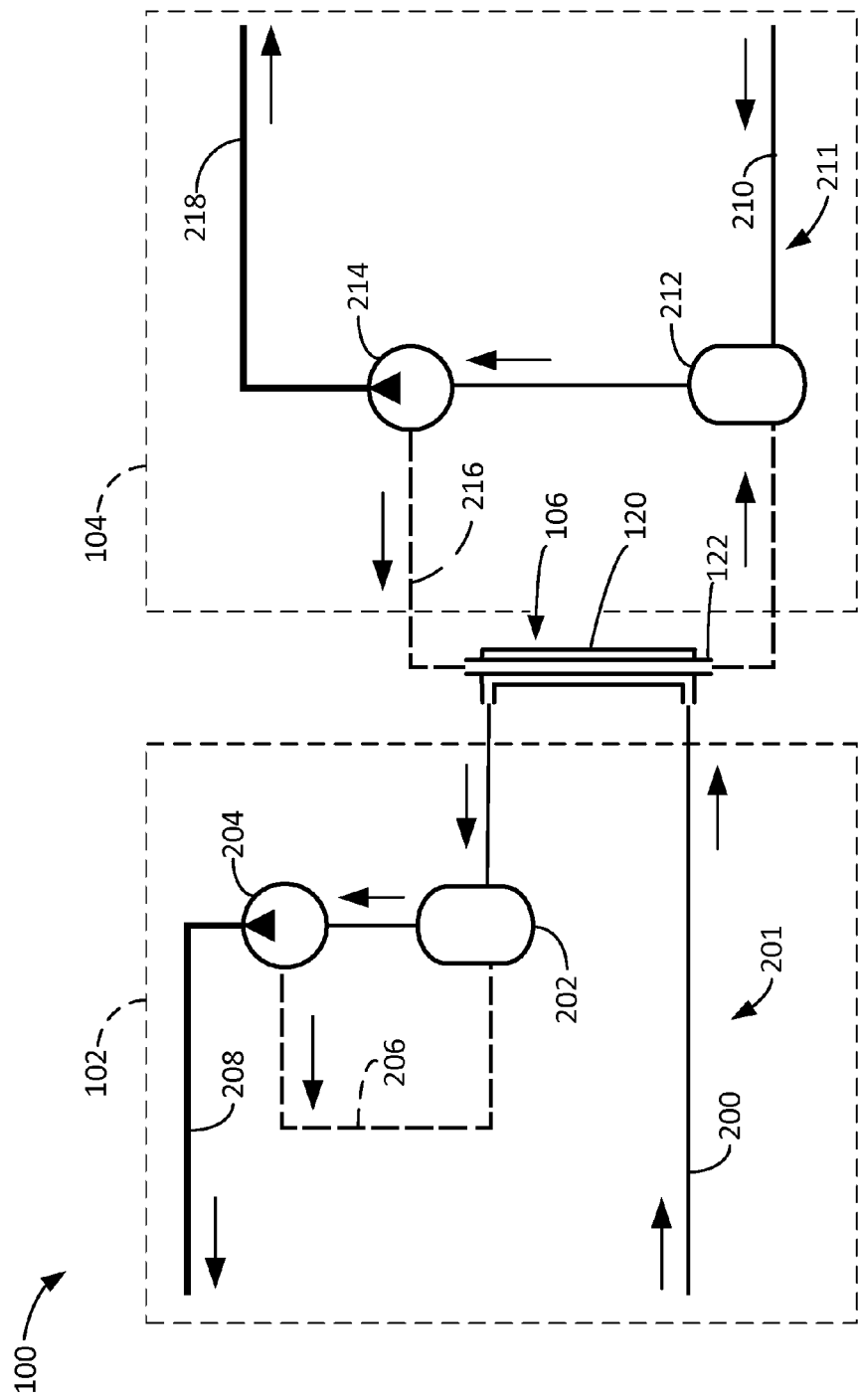
FIG. 2 is a block diagram of a first example configuration of the hydraulic systems of the aircraft of FIG. 1.

FIG. 2 is a block diagram of a first example configuration of first hydraulic system 102 and second hydraulic system 104. Heat exchanger 106 couples first hydraulic system 102 with second hydraulic system 104 such that heat is exchanged from second hydraulic system 104 to first hydraulic system 102. Heat exchanger 106 includes a first tube 120 and a second tube 122. First tube 120 is coupled in flow communication with first hydraulic system 102 and second tube 122 is coupled in flow communication with second hydraulic system 104. First tube 120 surrounds second tube 122, thereby enabling heat to be exchanged between first hydraulic system 102 and second hydraulic system 104 without mixing first hydraulic fluid 201 with second hydraulic fluid 211.

In first hydraulic system 102, a first hydraulic fluid 201 flows through a return line 200, which may be a trunk return line, through first tube 120 of heat exchanger 106, and then to a reservoir 202. A pump 204 is located downstream of reservoir 202 and pumps first hydraulic fluid 201 through a pressure line 208. A case drain 206 is coupled to pump 204 and to reservoir 202 and routes any of first hydraulic fluid 201 that leaks out of pump 204 back to reservoir 202. In second hydraulic system 104, a second hydraulic fluid 211 flows through a return line 210 to a reservoir 212 and then to a pump 214. Pump 214 pumps second hydraulic fluid 211 through a pressure line 218. Additionally, a case drain 216 is coupled to pump 214 and to reservoir 212. Case drain 216 routes any of second hydraulic fluid 211 that leaks out of pump 214 through second tube 122 of heat exchanger 106 and back to reservoir 212. As a characteristic of a hydraulic pump, for example pump 204, case drain fluid carries heat due to pump inefficiency and is, for example, 30 degrees Fahrenheit hotter than the pump inlet fluid from a reservoir, for example reservoir 202. Therefore, fluid in case drain 206 of pump 204 may be, for example, 30 degrees Fahrenheit hotter than fluid in reservoir 202 and fluid in case drain 216 of pump 214 may be, for example, approximately 30 degrees Fahrenheit hotter than fluid in reservoir 212. Additionally, second hydraulic system 104 may be, for example, 20 degrees Fahrenheit hotter than first hydraulic system 102, as described above. As a result, second hydraulic fluid 211 flowing through second tube 122 of heat exchanger 106 may be maintained at a higher temperature (for example, approximately 50 degrees Fahrenheit, assuming no heat is exchanged) than first hydraulic fluid 201 flowing through first tube 120 of heat exchanger 106.

Figure 3:
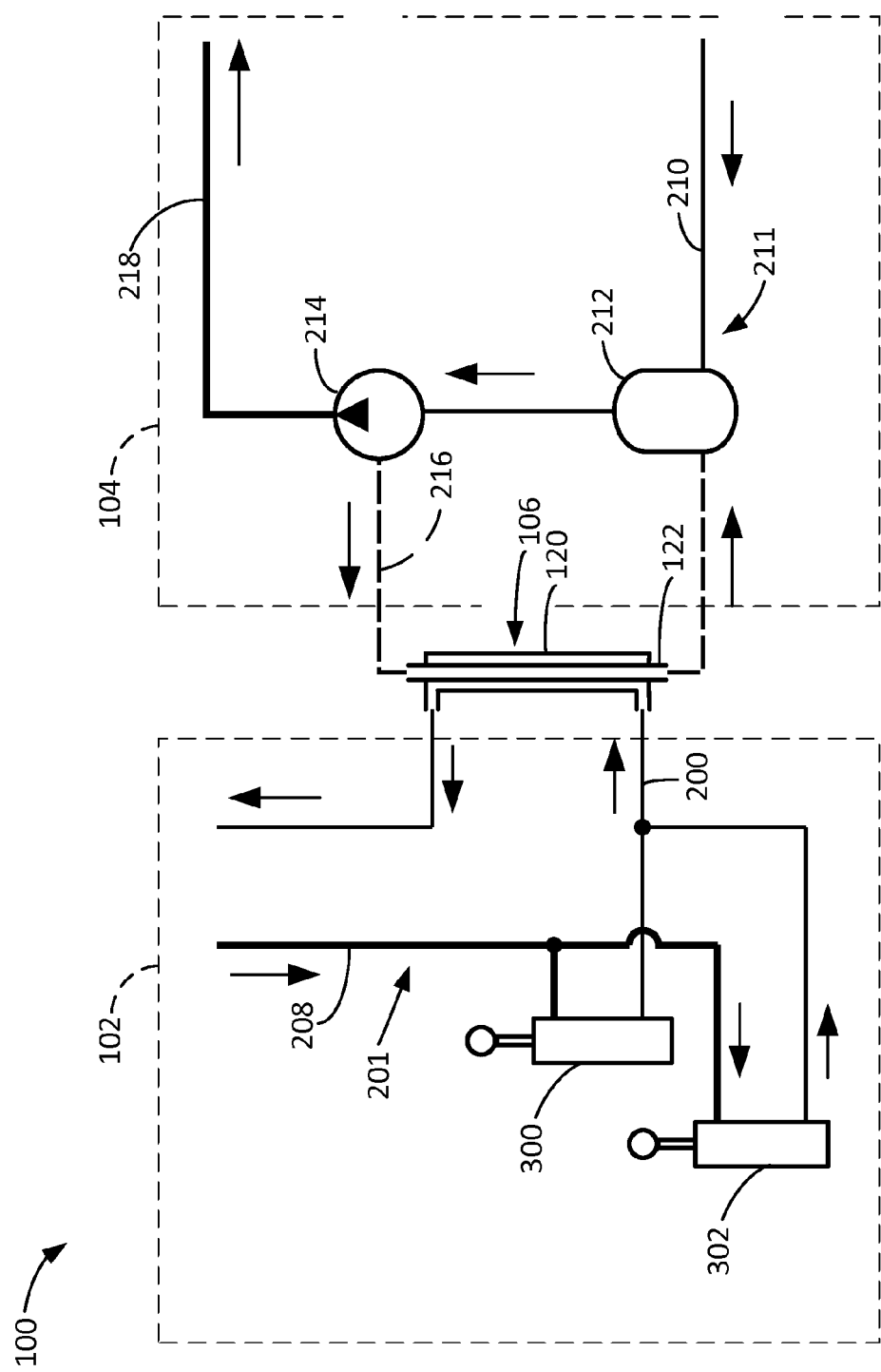
FIG. 3 is a block diagram of a second example configuration of the hydraulic systems of the aircraft of FIG. 1.

FIG. 3 is a block diagram of a second example configuration of first hydraulic system 102 and second hydraulic system 104 of aircraft 100. More specifically, heat exchanger 106 couples first hydraulic system 102 with second hydraulic system 104 in a different location than in FIG. 2. In first hydraulic system 102, first hydraulic fluid 201 flowing through pressure line 208 is received in a first actuator 300, which may control, for example, spoiler 110 (shown in FIG. 1) and a second actuator 302, which may control, for example, elevator 112 (shown in FIG. 1). First hydraulic fluid 201 then passes through return line 200, which may be a branch return line, and through first tube 120 of heat exchanger 106. Second hydraulic system 104 is configured as described with reference to FIG. 2. The configuration shown in FIG. 3 may be used instead of or in addition to the configuration shown in FIG. 2 depending on design considerations, for example available space for components and/or how close first hydraulic system 102 is to second hydraulic system 104 at various points in aircraft 100.

Figure 4:
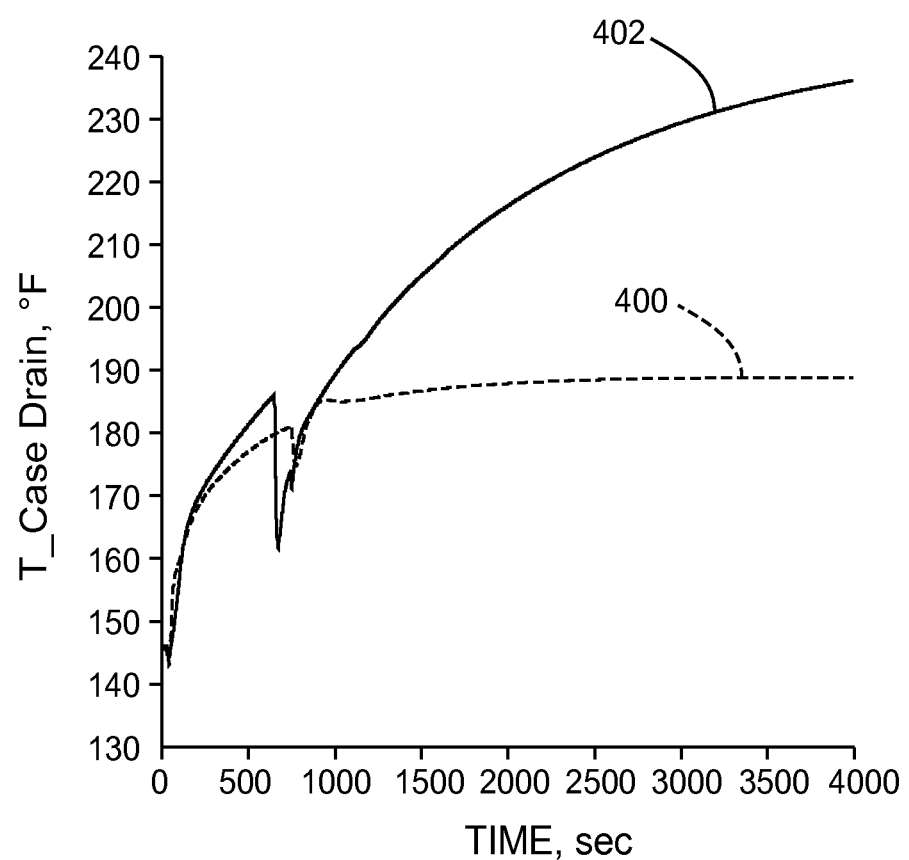
FIG. 4 is a graph of temperatures of the hydraulic systems of FIG. 1 when the hydraulic systems are not coupled by a heat exchanger.

FIG. 4 is a graph of temperatures of first hydraulic system 102 and second hydraulic system 104 when first hydraulic system 102 and second hydraulic system 104 are not coupled together by heat exchanger 106. The outside ambient temperature is a first ambient temperature. The temperature of first hydraulic fluid 201 in case drain 206 is represented by curve 400 and the temperature of second hydraulic fluid 211 in case drain 216 is represented by curve 402. As time progresses, the temperature in case drain 216 exceeds the temperature in case drain 206. After a first time period elapses, the temperature in case drain 216 is a first number of degrees Fahrenheit higher than the temperature in case drain 206.

Figure 5:
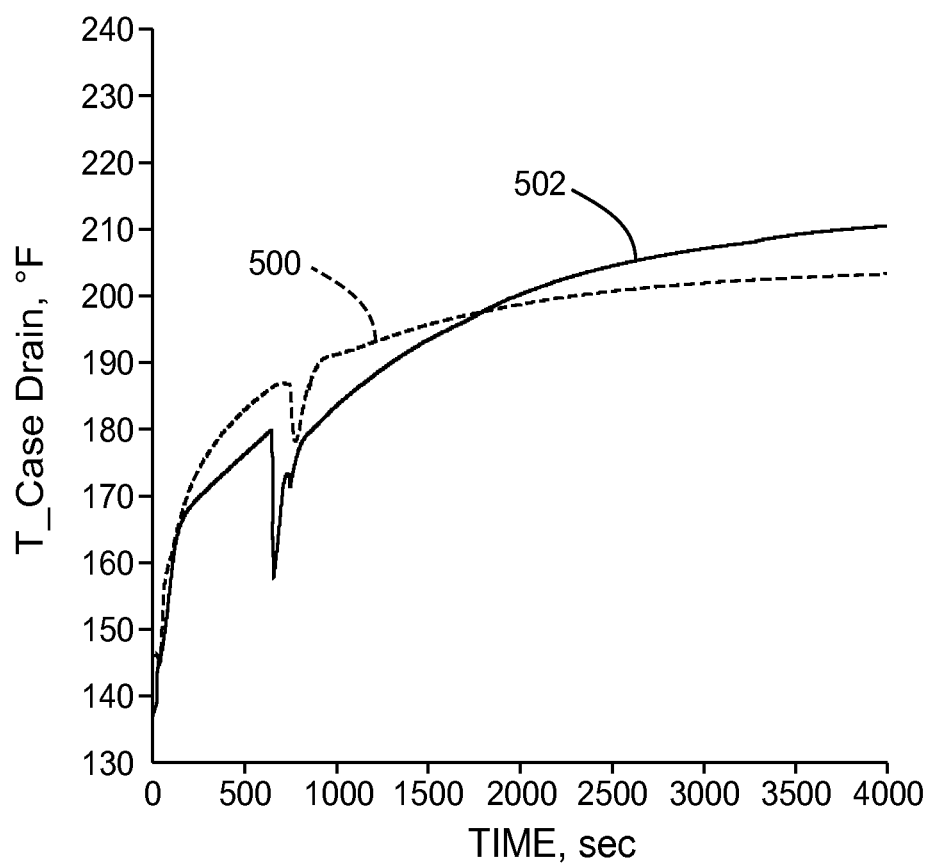
FIG. 5 is a graph of temperatures of the hydraulic systems of FIG. 1 when the hydraulic systems are coupled by a heat exchanger.

FIG. 5 is a graph of temperatures of first hydraulic system 102 and second hydraulic system 104 when first hydraulic system 102 and second hydraulic system 104 are coupled together by heat exchanger 106. The outside ambient temperature is, again, the first ambient temperature. The temperature of first hydraulic fluid 201 in case drain 206 is represented by curve 500 and the temperature of second hydraulic fluid 211 in case drain 216 is represented by curve 502. As compared to curves 400 and 402 of FIG. 4, curves 500 and 502 indicate that, after the first time period has elapsed, the temperatures in case drains 206 and 216 differ by a second number of degrees that is less than the first number of degrees. More specifically, heat exchanger 106 facilitates cooling second hydraulic fluid 211 in second hydraulic system 104 by transferring heat to first hydraulic fluid 201 in first hydraulic system 102.

Figure 6:
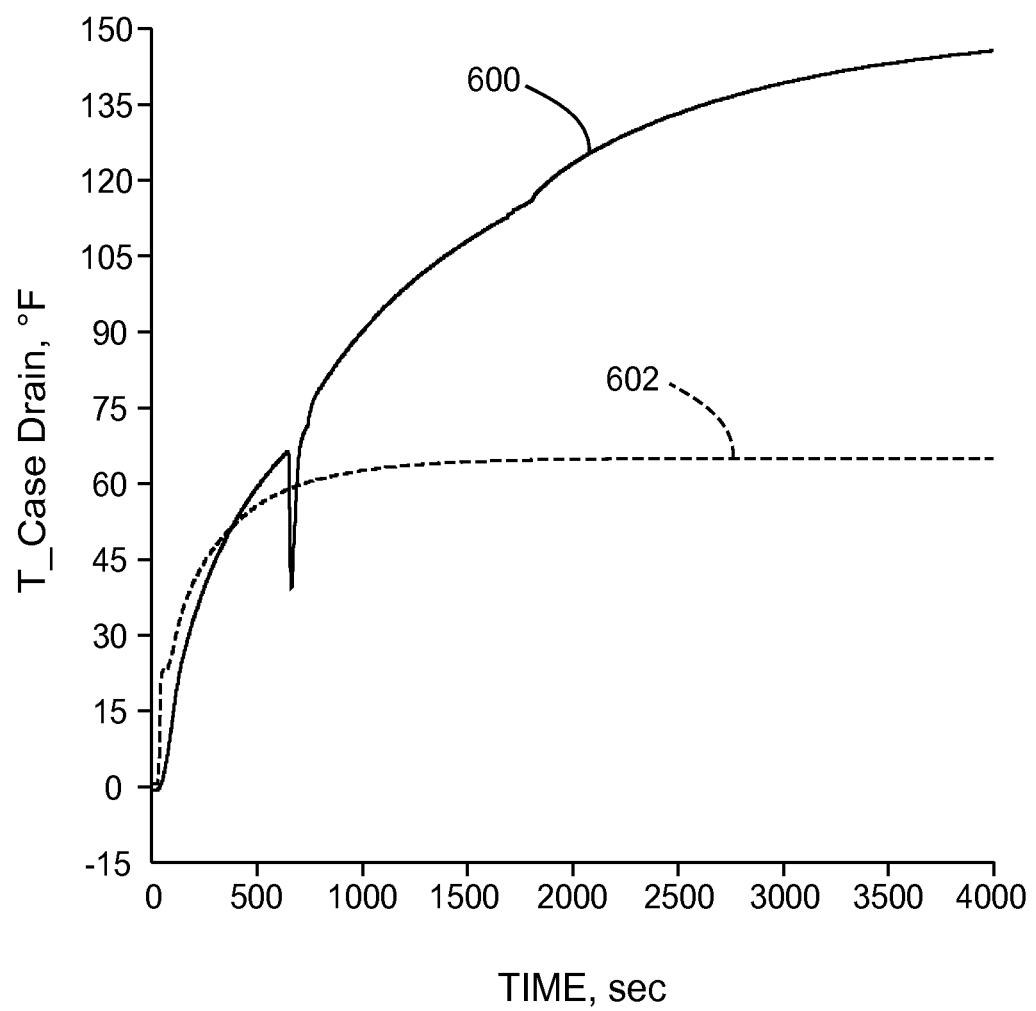
FIG. 6 is another graph of temperatures of the hydraulic systems of FIG. 1 when the hydraulic systems are not coupled by a heat exchanger.

FIG. 6 is another graph of temperatures of first hydraulic system 102 and second hydraulic system 104 when first hydraulic system 102 and second hydraulic system 104 are not coupled together by heat exchanger 106. The outside ambient temperature is a second ambient temperature that is less than the first ambient temperature. The temperature of second hydraulic fluid 211 in case drain 216 is represented by curve 600 and the temperature of first hydraulic fluid 201 in case drain 206 is represented by curve 602. As time progresses, the temperature in case drain 216 exceeds the temperature in case drain 206. After the first time period has elapse, the temperature in case drain 216 is a third number of degrees Fahrenheit higher than the temperature in case drain 206. The temperature of case drain 206 is stabilized and the temperature of reservoir 202 is lower than the temperature of case drain 206. The temperature of reservoir 202 is considered representative of a hydraulic system temperature that may not provide a preferred amount of hydraulic power for takeoff.

Figure 7:
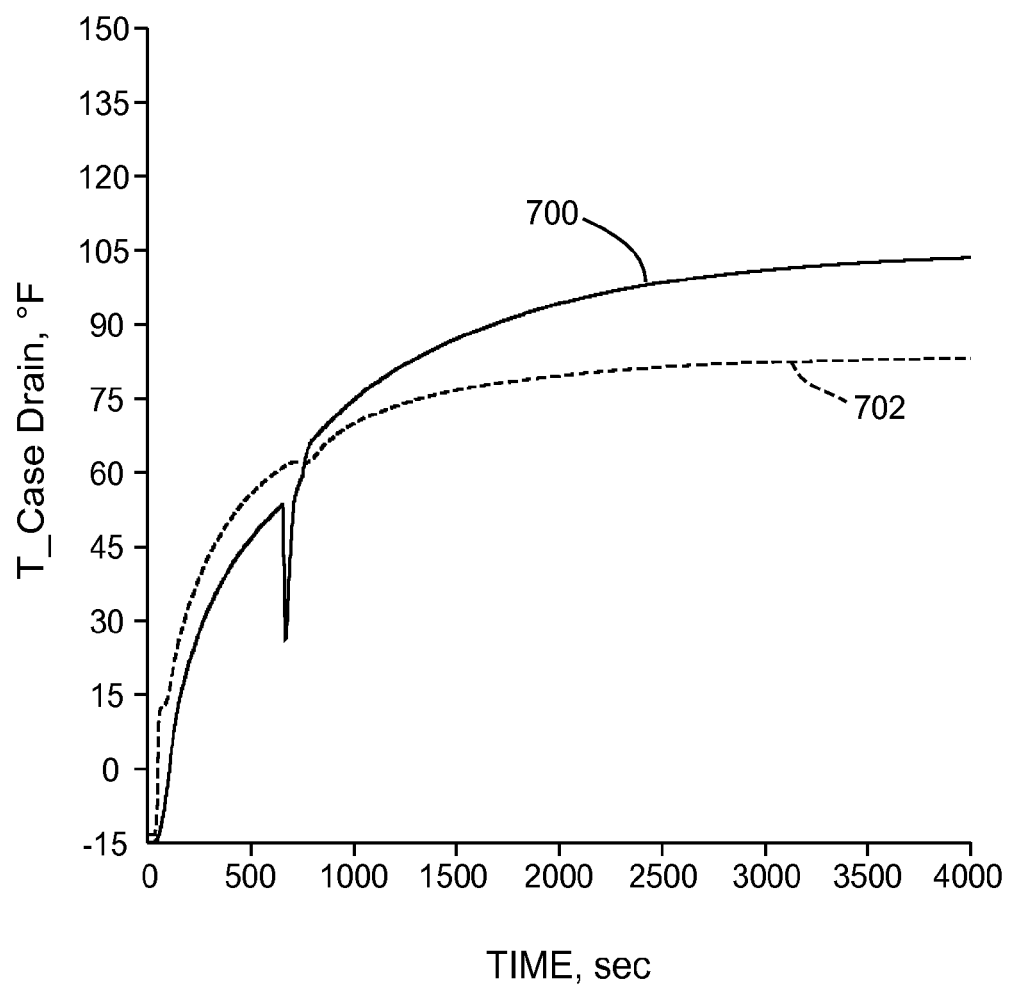
FIG. 7 is another graph of temperatures of the hydraulic systems of FIG. 1 when the hydraulic systems are coupled by a heat exchanger.

FIG. 7 is another graph of temperatures of first hydraulic system 102 and second hydraulic system 104 when first hydraulic system 102 and second hydraulic system 104 are coupled together by heat exchanger 106. The outside ambient temperature is, again, the second ambient temperature. The temperature of second hydraulic fluid 211 in case drain 216 is represented by curve 700 and the temperature of first hydraulic fluid 201 in case drain 206 is represented by curve 702. As compared to curves 600 and 602 of FIG. 6, curves 700 and 702 indicate that the temperatures in case drains 206 and 216 differ by a fourth number of degrees Fahrenheit after the first time period has elapsed. The fourth number of degrees is less than the third number of degrees discussed with reference to FIG. 6. More specifically, heat exchanger 106 facilitates heating first hydraulic fluid 201 in first hydraulic system 102 with heat transferred from second hydraulic fluid 211 in second hydraulic system 104.

Figure 8:
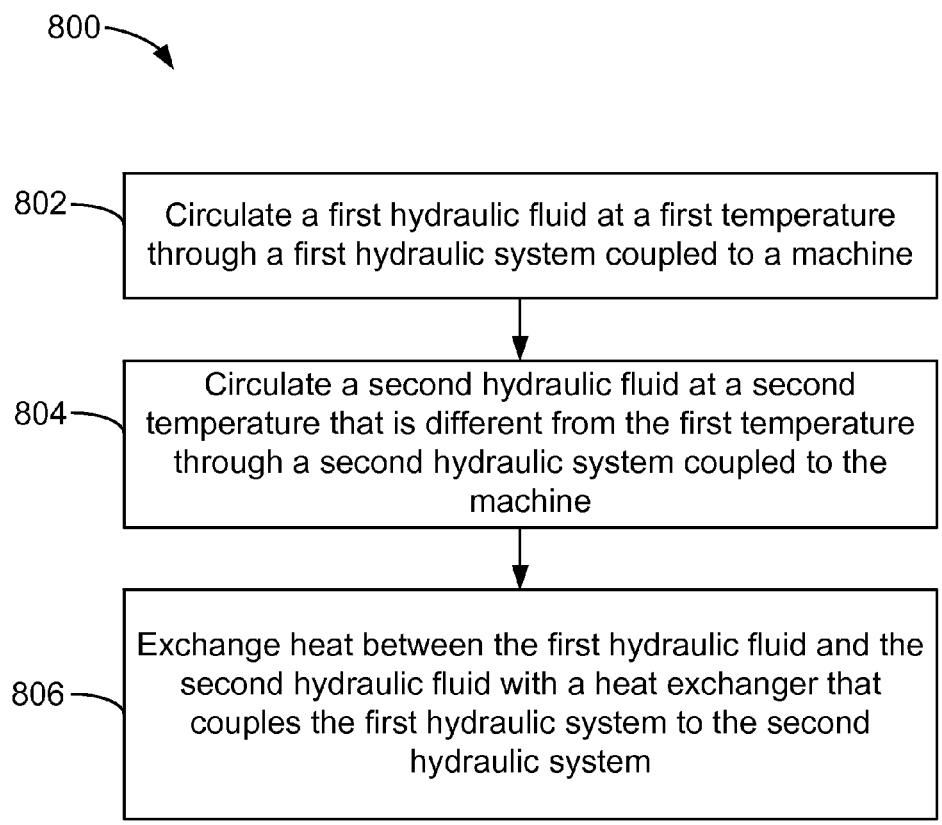
FIG. 8 is a flowchart of a method for managing temperatures in a machine, such as the aircraft of FIG. 1.

FIG. 8 is a flowchart of a method 800 for managing temperatures in a machine, such as aircraft 100 (shown in FIG. 1). Method 800 includes circulating 802 a first hydraulic fluid, for example first hydraulic fluid 201, at a first temperature through a first hydraulic system, for example first hydraulic system 102. First hydraulic system 102 is coupled to a machine, for example aircraft 100. Additionally, method 800 includes circulating 804 a second hydraulic fluid, for example second hydraulic fluid 211, at a second temperature that is different from the first temperature through a second hydraulic system, for example second hydraulic system 104. Second hydraulic system 104 is coupled to the machine, for example aircraft 100. Method 800 additionally includes exchanging 806 heat between the first hydraulic fluid 201 and the second hydraulic fluid 211 with a heat exchanger that couples first hydraulic system 102 to second hydraulic system 104. The heat exchanger may be, for example, heat exchanger 106.

As compared to known methods and systems for heating or cooling hydraulic fluid within an aircraft, the methods and systems described herein facilitate both heating and cooling hydraulic fluid with the same setup, and in a more efficient and cost-effective way by coupling hydraulic systems of different temperatures together with a heat exchanger.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermal management system comprising:
   a first hydraulic system for circulating a first hydraulic fluid to at least a first hydraulically activated component, said first hydraulic system comprising a first pump, a first case drain line, a first reservoir, and a first return line coupled between said at least first hydraulically activated component and said first reservoir;
   a second hydraulic system for circulating a second hydraulic fluid to at least a second hydraulically activated component, said second hydraulic system comprising a second pump, a second reservoir, and a second case drain line coupled between said second pump and said second reservoir; and
   a heat exchanger coupled to said first return line and to said second case drain line, wherein said heat exchanger is configured to exchange heat between the first hydraulic fluid and the second hydraulic fluid, such that a temperature of the first hydraulic fluid in said first reservoir is stabilized above a threshold temperature that corresponds to a threshold amount of hydraulic power for operation of said at least first hydraulically operated component.

2. The thermal management system of claim 1, wherein said heat exchanger is further configured such that the stabilized temperature of the first hydraulic fluid in said first reservoir is less than a temperature of the first hydraulic fluid in said first case drain line.

3. The thermal management system of claim 1, wherein said heat exchanger is coupled to said first return line upstream from and proximate said pump first reservoir.

4. The thermal management system of claim 1, wherein said heat exchanger is coupled to said first return line proximate said at least first hydraulically activated component.

5. The thermal management system of claim 1, wherein said heat exchanger is a tube-in-tube heat exchanger comprising:
   a first tube; and
   a second tube, wherein said first tube circumscribes said second tube.

6. The thermal management system of claim 5, wherein said first tube is in flow communication with said first hydraulic system and said second tube is in flow communication with said second hydraulic system.

7. The thermal management system of claim 6, wherein said heat exchanger is further configured such that a stabilized temperature of the first hydraulic fluid in said first case drain line is within about 30 degrees Fahrenheit of a stabilized temperature of the second hydraulic fluid in said second case drain line.

8. An aircraft comprising:
   a first hydraulic system for circulating a first hydraulic fluid to at least a first control surface actuator, said first hydraulic system comprising a first pump, a first case drain line, a first reservoir, and a first return line coupled between said at least first control surface actuator and said first reservoir;
   a second hydraulic system for circulating a second hydraulic fluid to at least a second control surface actuator, said second hydraulic system comprising a second pump, a second reservoir, and a second case drain line coupled between said second pump and said second reservoir; and
   a heat exchanger coupled to said first return line and to said second case drain line, wherein said heat exchanger is configured to exchange heat between the first hydraulic fluid and the second hydraulic fluid, such that a temperature of the first hydraulic fluid in said first reservoir is stabilized above a threshold temperature that corresponds to a threshold amount of hydraulic power for operation of said at least first control surface actuator.

9. The aircraft of claim 8, wherein said heat exchanger is further configured such that the stabilized temperature of the first hydraulic fluid in said first reservoir is less than a temperature of the first hydraulic fluid in said first case drain line.

10. The aircraft of claim 8, wherein said heat exchanger is coupled to said first return line upstream from and proximate said first reservoir.

11. The aircraft of claim 8, wherein said heat exchanger is coupled to said first return line proximate said at least one control surface actuator.

12. The aircraft of claim 11, wherein said at least first control surface actuator is coupled to at least one of a spoiler, an elevator, and a rudder.

13. The aircraft of claim 8, wherein said heat exchanger is a tube-in-tube heat exchanger comprising:
   a first tube; and
   a second tube, wherein said first tube circumscribes said second tube.

14. The aircraft of claim 13, wherein said first tube is in flow communication with said first hydraulic system and said second tube is in flow communication with said second hydraulic system.

15. The aircraft of claim 14, wherein said heat exchanger is further configured such that a stabilized temperature of the first hydraulic fluid in said first case drain line is within about 30 degrees Fahrenheit of a stabilized temperature of the second hydraulic fluid in said second case drain line.

16. The aircraft of claim 8, further comprising at least one engine and wherein said first pump is drivingly coupled to said at least one engine.

17. The aircraft of claim 8, further comprising landing gear and wherein said second hydraulic system is further configured to circulate the second fluid to said landing gear.

18. The thermal management system of claim 1, wherein said heat exchanger is further configured to prevent dissipation of heat to the surrounding ambient.

19. A method for managing temperatures in a machine, said method comprising:
  circulating a first hydraulic fluid through a first hydraulic system coupled to at least a first hydraulically activated component of the machine, the first hydraulic system including a first pump, a first case drain line, a first reservoir, and a first return line coupled between the at least first hydraulically activated component and the first reservoir;
  circulating a second hydraulic fluid through a second hydraulic system coupled to at least a second hydraulically activated component of the machine, the second hydraulic system including a second pump, a second reservoir, and a second case drain line coupled between the second pump and the second reservoir; and
  exchanging heat between the first hydraulic fluid and the second hydraulic fluid with a heat exchanger coupled to the first return line and to the second case drain line, such that a temperature of the first hydraulic fluid in the first reservoir is stabilized above a threshold temperature that corresponds to a threshold amount of hydraulic power for operation of the at least first hydraulically operated component.

20. The method of claim 19, wherein exchanging heat with the heat exchanger further comprises stabilizing the temperature of the first hydraulic fluid in the first reservoir to be less than a temperature of the first hydraulic fluid in the first case drain line.

21. The method of claim 19, wherein wherein exchanging heat with the heat exchanger further comprises stabilizing the temperature of the first hydraulic fluid in the first case drain line to be within about 30 degrees Fahrenheit of a stabilized temperature of the second hydraulic fluid in the second case drain line.

* * * * *